United States Patent [19]

McVey

[11] 3,937,937
[45] Feb. 10, 1976

[54] PRIMARY POWER FAULT DETECTOR

[75] Inventor: Irvin Maurice McVey, Agoura, Calif.

[73] Assignee: Xerox Corporation, Stamford, Conn.

[22] Filed: Dec. 26, 1973

[21] Appl. No.: 428,602

[52] U.S. Cl......... 235/153 R; 235/153 AK; 317/43; 324/51; 340/146.1 R; 340/172.5
[51] Int. Cl.²..................... H02H 3/26; G06F 11/00
[58] Field of Search..... 235/153 A, 153 R, 153 AK; 324/51, 142, 124; 317/31, 43; 340/146.1 R, 213 R, 248 B, 248 R, 253 R, 172.5

[56] References Cited
UNITED STATES PATENTS

| | | | |
|---|---|---|---|
| 3,167,685 | 1/1965 | Bade et al....................... | 235/153 R |
| 3,274,444 | 9/1966 | Boudreau et al............ | 340/146.1 R |
| 3,321,747 | 5/1967 | Adamson......................... | 340/172.5 |
| 3,518,491 | 6/1970 | Downs.................................. | 317/43 |
| 3,700,919 | 10/1972 | Stich..................................... | 317/43 |
| 3,720,872 | 3/1973 | Russell et al.......................... | 324/51 |
| 3,801,963 | 4/1974 | Chen.............................. | 235/153 R |

*Primary Examiner*—Malcolm A. Morrison
*Assistant Examiner*—Errol A. Krass
*Attorney, Agent, or Firm*—James J. Ralabate; Michael J. Colitz; Franklyn C. Weiss

[57] ABSTRACT

Data processing and computer systems require continuous monitoring of the primary alternating current power. A power failure must be detected very quickly (within a fraction of a cycle), so that the contents of a volatile memory can be quickly converted into a non-volatile form. This must occur before power system storage is expended and control is lost. RMS power direction is developed by the product of voltage and current with an integrated circuit multiplier device. When power fails, the circuit indicates a power flow reversal or power equals zero from the detected system current times voltage factor. A retriggerable one-shot in conjunction with a NAND gate is utilized to detect the instantaneous voltage drop to zero and current reversal in order to energize other circuits to protect such volatile data in the event of a power failure.

18 Claims, 3 Drawing Figures

PRIMARY POWER FAULT DETECTOR

BACKGROUND OF THE INVENTION

In a computer system, instructions are carried out within a central processing unit in accordance with programmed instructions and the designed hardware of the unit itself. Due to the inherent operation of storage and other data processing circuitry within a computer system, the data being operated on is in a precarious position in the event of a power loss. In the event of a brownout or power system failure, prior art computer systems would lose certain data within the computer due to the fact that these circuits do not have any inherent storage capability once power is lost. Thus, if a failure occurs, certain important input and/or operating data could be lost in addition to consumption of valuable time during the running of a program in that at subsequent reinstitution of power, the data that has been operated upon will have been lost and subsequent operations may not be valid due to the loss of the data during the power failure.

Thus, it would be highly desirable that at the instant or shortly thereafter of the power failure, volatile data within the computer system be immediately stored in a non-volatile storage medium such as magnetic tape, magnetic disc or other storage devices which permanently store data even in the event of a power system failure.

OBJECTS OF THE INVENTION

An object of the present invention is to protect volatile data within a data processing system in the event of a power failure. Another object of the present invention is to monitor the reversal of current flow from input to output in a system due to a power failure in order to ensure proper system competency upon reinstitution of said power.

Another object of the present invention is to detect power system failures within a predescribed amount of time and immediately store volatile data in a non-volatile environment utilizing inherent power storage within the system.

It is another object of the present invention to provide a system that will remember certain volatile data during the course of operation and subsequent power failure at the time power is reinstituted to the system.

It is another object to monitor the voltage and current input to and output from a computer system to denote the radical changes in the voltage and current at the time of power failure in order to protect volatile data from loss due to said power system failure.

Another object of the present invention is to detect during a power system failure, the instantaneous voltage drop to zero and the immediate reversal of current due to said power failure in order to engage certain procedures within the data processing system, utilizing stored power within the system, to immediately store in a non-volatile memory that volatile data which could be lost permanently due to said power failure.

SUMMARY OF THE INVENTION

The present invention utilizes voltage sense and current sense apparatus in order to detect the power flowing into and out of a computer system. Utilizing operational amplifiers coupled to the input voltage and current sensors, voltage signals are generated in direct relation to the voltage and current signals detected. These voltage signals are multiplied in order to detect the actual power of the system. At system or power failure, a retriggerable one shot is energized in order to detect the reversal of current and the instantaneous dropping to zero of the voltage, wherein in conjunction with a NAND gate, a flip-flop circuit will be set. The change of output signals from the flip-flop can be utilized to further instruct a separate operation to protect the loss of valuable data during the operation of a program within a computer system.

DESCRIPTION OF THE DRAWINGS

For a more complete understanding of the invention, as well as other objects and further features thereof, reference may be had to the following detailed description of the invention in conjunction with the drawings wherein.

DETAILED DESCRIPTION OF THE INVENTION

Figure 1:
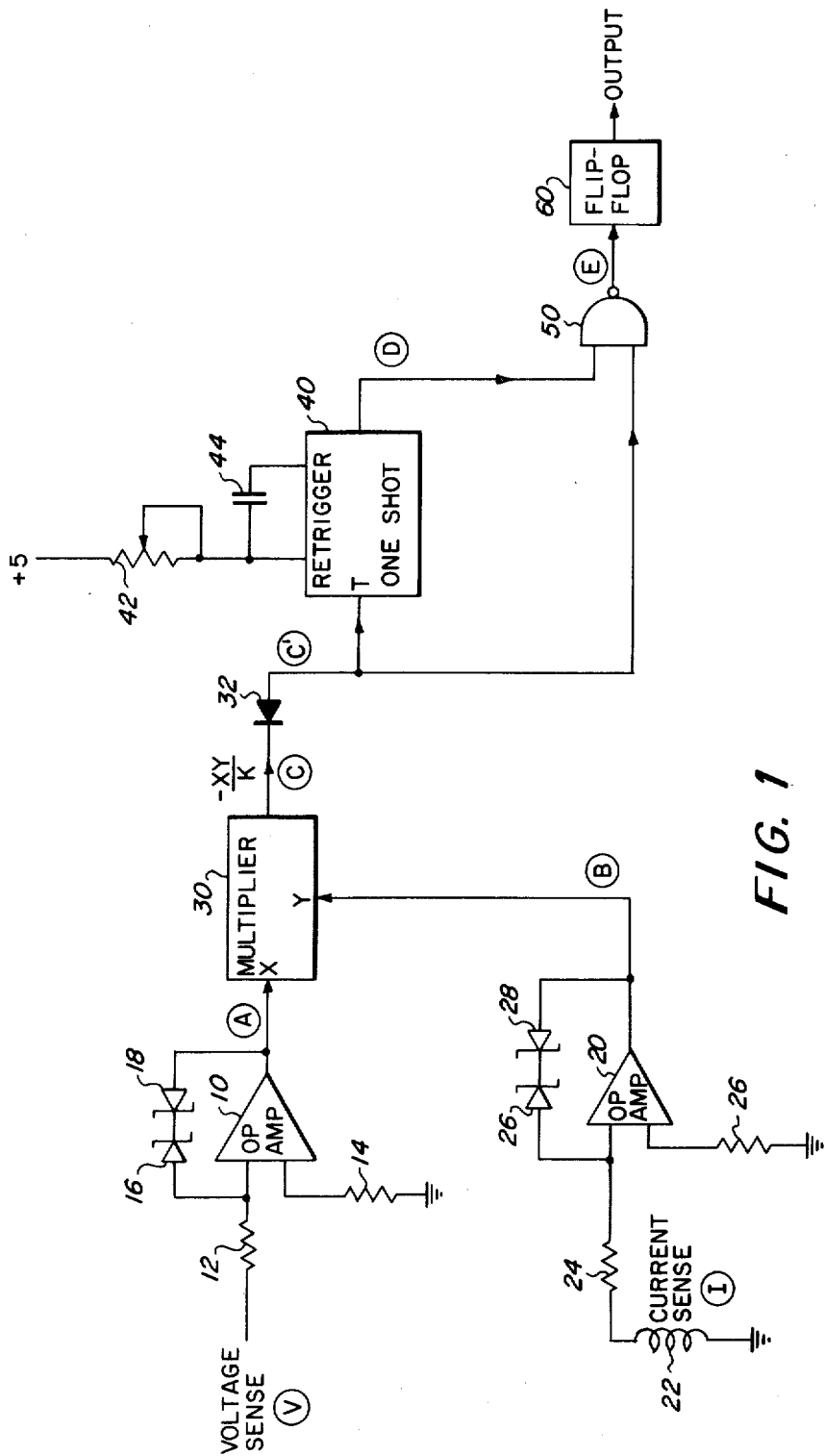
FIG. 1 is a schematic diagram of the primary power fault detection circuit incorporating the principles of the present invention.

FIG. 1 is a partly schematic, partly block diagram of the circuitry utilized as the primary power fault detector. The voltage input sense line V is coupled to operational amplifier 10 via resistor 12. The other input to the operational amplifier is resistor 14 which is coupled directly to ground. Between the output of the operational amplifier 10 and its input at resistor 12 are limiter diodes 16 and 18. The output of the OP AMP 10 is designated as Signal A on FIG. 2. The current sense Signal I is provided by transformer 22 which is coupled to the input of operational amplifier 20 via resistor 24. The other input to the operational amplifier 20 is resistor 26. Between the resistor 24 and the input to the OP AMP 20 and the output of the OP AMP are limiter diodes 26 and 28. The output of OP AMP 20 is designated as Signal B on FIG. 2. Resistors 12, 14, 24 and 26 are utilized to balance the input to the OP AMPS. That is, the impedance at the inputs of the OP AMPS has to be equal with minimum thermal drift. For a type 741 OP AMP, 10K or 20K resistors are typical.

Figure 2:
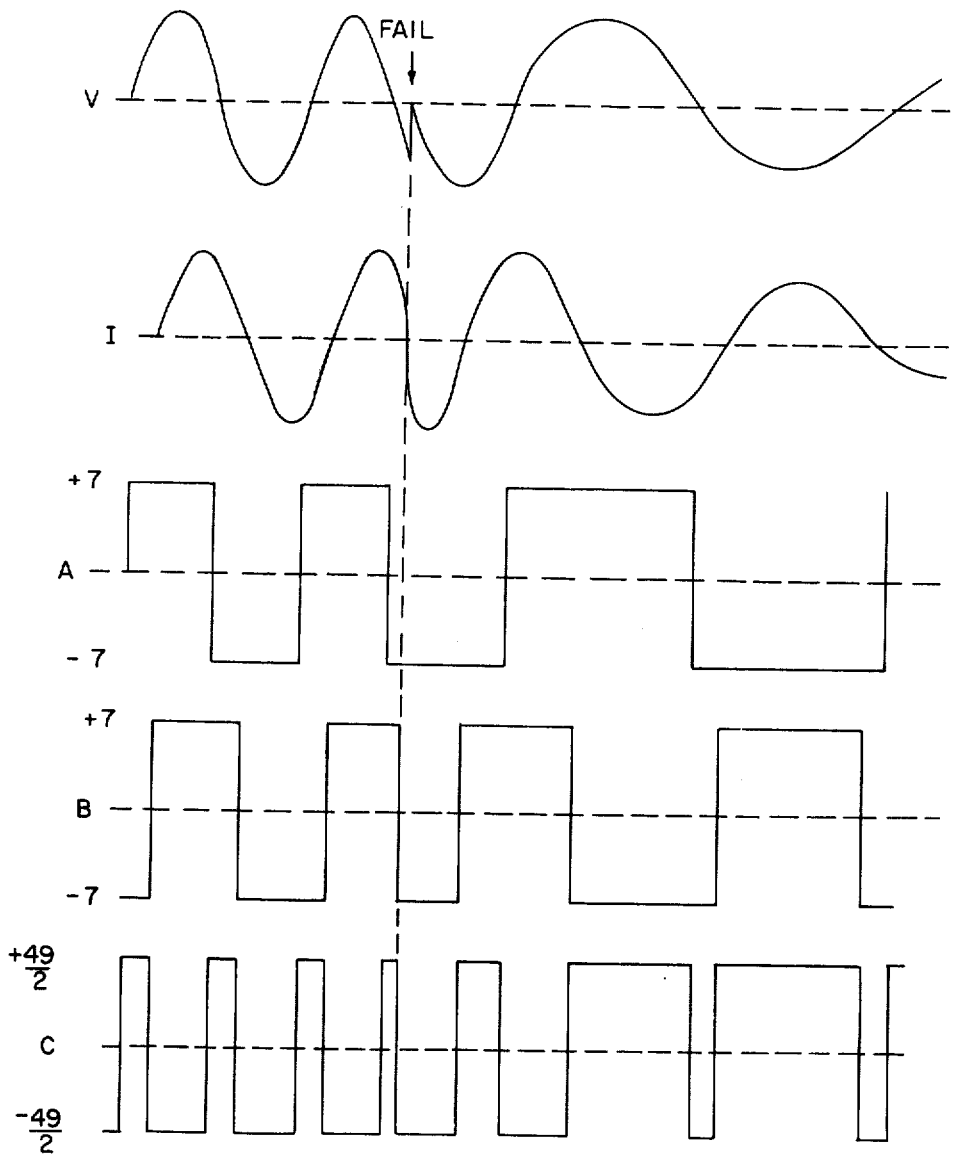
FIGS. 2 and 3 are representative diagrams of various signals found in the circuitry of FIG. 1 useful in understanding the various aspects of the present invention.
Figure 3:
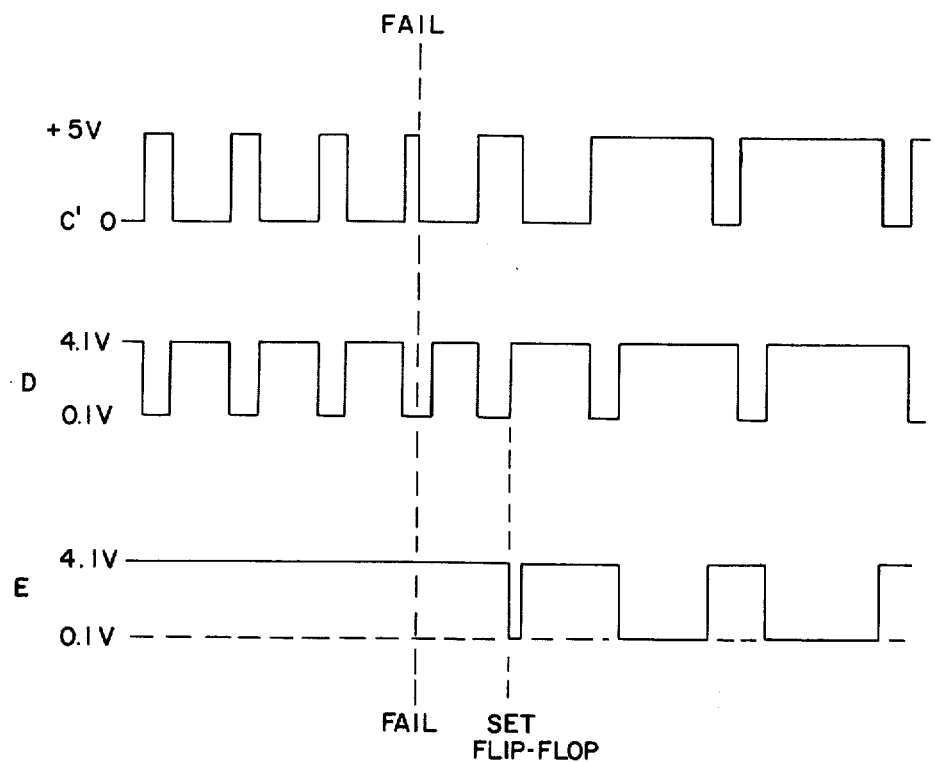

Signal A is then coupled to the X input of multiplier 30. Signal B is coupled to the Y input of multiplier 30. The output of the multiplier, Signal C on FIG. 2, is connected to the cathode of diode 32. The anode of diode 32 is Signal C', seen on FIG. 3'. Signal C' is connected to the T or trigger input to one-shot 40 and also one input of NAND gate 50. Shown at one-shot 40 are adjustable resistor 42 and capacitor 44 connected to a typical 5 volt supply, which are utilized for setting the time constant, i.e., duration of the output signal of one-shot 40. The output of the one-shot 40 is designated as Signal D found in FIG. 3. Signal D provides the other input to NAND gate 50. The output of NAND gate 50 is designated as Signal E found in FIG. 3. This Signal E provides the set/reset input to flip-flop 60 in FIG. 1.

The basic operation of the power fault detector is to detect power flow into and out of the system in actual watts. FIG. 2 shows Signal V which is the representation of the input voltage to the system, which could be, of course, the standard 120 volts alternating current. Curve I in FIG. 2 shows a representative drawing of the current sensed by transformer 22 in FIG. 1. Transformer 22 could be, for example, a transformer with a core and a few thousand turns of wire in the main power cable to the system in which this power fault detector is utilized. The transformer detects the current by means of magnetic coupling through resistor 24 to OP AMP 20.

During the normal operation of the system, that is when the system is up and running, the voltage sensed, FIG. 2V, is the normal 60 cycle signal of the standard 120 volt power line. Also, at this time, the current is also following a 60 cycle repetitive pattern, but there is a slight phase shift between the voltage and current in the system due to resistive, inductive and capacitive impedances of the system itself. Thus, FIGS. 2V and 2I are shown slightly out of phase as representing a true condition during the normal operation of the system. Due to forward and reverse biased diodes 16 and 18, the output of OP AMP 10 is Signal A shown on FIG. 2. Depending upon the diodes chosen, the output of OP AMP 10 could be any voltage but for purposes of illustration diodes 16 and 18 could limit the voltage at say 7 volts. Thus, FIG. 2A shows rectangular shaped signals of amplitude plus and minus 7 volts, the zero crossings of FIG. 2A occuring at the signal crossings of the 120 volt power supply signal input at FIG. 2V. Also, diodes 26 and 28 operate in a similar manner giving a plus and minus 7 volt signal, slightly delayed due to the phase shift alluded to previously. Thus, the output of OP AMP 20 is Signal B shown at FIG. 2.

Signals A and B are then applied to the X and Y, respectively, inputs of multiplier 30. If there was no phase shift, and power was flowing into the system, the output signal from multiplier 30 would be almost a perfect direct current due to the fact that the multiplier takes the product of its X and Y inputs. That is, a plus times a plus voltage would be a plus voltage, while a minus times a minus voltage would also be a plus indication and thus, in the zero phase shift situation, the output of multiplier 30 would, in fact, be an approximately DC signal. However, inasmuch as there is actually a phase shift in any normal operating system, the output of multiplier 30 would not be a true DC signal. In the embodiment shown, at FIGS. 2A and 2B, the action of multiplier 30 produces a signal shown at FIG. 2C. That is, at the times that the minus 7 voltage of FIG. 2B is multiplied with the plus 7 voltage at FIG. 2A, the output is shown as a positive 49 over 2 signal at FIG. 2C. The 49 over 2 indication is the inherent multiplication factor of the multiplier 30, which could be, for example, a Motorola multiplier MC1494 unit commonly available in the marketplace. However, multiplier 30 has an inherent minus factor in the multiplication of these two signals, the minus 7 times plus 7 voltage, normally producing a minus output, would be a positive output due to the minus multiplication factor of multiplier 30. Thus, while the system is up and running in a normal fashion, FIG. 2C produces rectangular shaped signals as shown in the left side of FIG. 2C.

Continuing on through the operation of FIG. 1 in a normal up and running condition, the signals shown in FIG. 2C, as the output of multiplier 30, are applied to diode 32 in the reverse biased position in order to limit the voltage applied to the retrigger circuit 40 and NAND gate 50. Thus, the other side of diode 32 is shown as Signal C' seen at FIG. 3C'. FIG. 3C' is the same as FIG. 2C except for the fact that the amplitude of the signals are now limited at a voltage which could be, for example, five volts depending upon the choice of diode 32. Signal C' is now applied to the input of one-shot 40 and one input of NAND gate 50. The voltage level in FIG. 3C' is shown as 5 volts but it would normally be slightly less than that due to the voltage drop through diode 32.

One-shot 40 is triggered by the rising edge of the 5 volt signals shown in FIG. 3C'; and according to the one-shot chosen the output therefrom could be signals varying between plus 0.1 volts and 4.1 volts as shown in FIG. 3D as signal D. Such a one-shot could be a type 9601 commonly available. Typical transistor-transistor-logic (TTL) signals would vary, therefore, between 100 millivolts and a maximum of 4.1 volts. The width of the signals shown in FIG. 3D is shown approximately equal to the width of signals shown in FIG. 3C' but this is for ease of illustration only as by varying resistor 42 in conjunction with capacitor 44 could, if desired, change the width of the signals within the limits of one-shot 40.

Signal D and Signal C' are now applied to the inputs of NAND gate 50. Still discussing the system in the up and running situation, the output of NAND gate 50 will be Signal E shown in FIG. 3. This signal will be normally a constant voltage output at approximately 4.1 volts as indicated above for the standard transistor-transistor-logic. This is due to the fact that the one-shot is being triggered at the rising edges of Signal C'. The truth table of a NAND gate indicates a logic one out when the inputs are logic 00, logic 01 and logic 10. Thus even if Signal D is wider, as discussed above, there will not be any instance where Signal C' or Signal D will both be in a logic 1 condition due to the triggering of one-shot 40 at the rising edge of Signal C'. Thus, in the normal operating situation, the output of NAND gate 50 is Signal E, at FIG. 3, at a constant voltage shown as 4.1 volts which continues to maintain flip-flop 60 in one state. The subsequent circuitry coupled to flip-flop 60 monitors this indication indicating a normal operating, i.e., up and running situation.

It may be good at this point to reiterate certain inherent facts of the circuit during normal operation. Inasmuch as power flow is detected into the system, an instantaneous signal is developed which is proportional to to volts times amps going into the system. Since there is a normal phase shift between the two signals due to the power factor of the system, as there is a slight phase shift between voltage and current in the system, the voltage and current signals sensed will be slightly out of phase and thus the multiplier will generate signals in proportion to the voltage and current sensed and its phase relationship. Inasmuch as there are no false inputs to the multiplier circuit 30, retriggered one-shot 40 and NAND gate 50 generate the signals shown in FIG. 3 which gives the steady DC output Signal E in FIG. 3. In order to protect the data which may be in volatile storage devices, an instantaneous high speed indication of a power fault is desired. Due to the internal storage of power within the system, the circuit looks for an instantaneous reversal of current due to the cessation of input flow to a reversal of current flowing out of instead of into the system. It is apparent, therefore, that the present invention has applicability not only to computer and data processing systems, but to any system where quick action is necessary at the initial stages of power interruption.

The current reversal situation would occur, for example, if the input power to the system was terminated due to a power failure, such as one undetermined due to the power company, or as simple as human intervention by turning off the power switch or an accidental removal of the power cord from a power source. The input voltage would then go instantaneously to zero or at least pretty close thereto, in the milli-second range, at least faster than a quarter cycle of the 60 cycle input signal. At that time the internal power stored in the system would begin supplying power initially at the normal 60 cycle rate due to the resonance of the power supply circuits. Similarly, at this time, current would begin flowing out of the system due to this same energy storage due to internal impedance. This situation can be seen by examining FIGS. 2V and 2I at the instant designated as FAIL. The 60 cycle voltage and current signals will begin at a 60 cycle resonant frequency but will decay towards a lower frequency as time progresses. The signals shown to the right of the FAIL point is shown exaggerated for purposes of example. It is important to note that at the FAIL point, power begins to flow out of instead of into the system. As the invention shown in FIG. 1 is taking the product of volts and amps, it will instantly detect the moment when current reverses even though the voltage still exists on the voltage sense and current actually starts flowing the opposite way out of the system.

At the moment of failure, the voltage continues in the same direction, so Signal A, FIG. 2A, does not change its polarity and the signal will not reverse again until the voltage crosses the zero crossing line shown at FIG. 2V. However, the current instantaneously reverses as seen in FIG. 2B. Accordingly, multiplier 30 which has been seeing proportional input signals now instantaneously notes the 180 degree reversal of current from OP AMP 20 and instantaneously reverses the polarity of the signal as shown in FIG. 2C. FIG. 3C' denotes the limited version of the signal after action by diode 32. At the particular FAIL point designated, for example, the fail time happens at a time that the one-shot 40 is generating a signal. Thus, the output of NAND gate 50 remains at a high, or logic 1, output for the time being.

As the power begins flowing out of the system, with a reversal of current polarity, the Signals A and B are shown accordingly in conjunction with its crossings of the zero axis in FIGS. 2V and 2I. The output signals of multiplier 30 are no longer proportional to the standard power factor delay but begins to generate signals of varying width in accordance with the zero crossings of the current and voltage seen in FIG. 2. However, one-shot 40 continues to generate signals of constant width due to its time constant determined by resistor 42 and capacitor 44. Thus, the first signal pulse to the right of the FAIL point in FIG. 3C' is wider than the time of the output from one-shot 40, Signal D, and thus for the first time NAND gate 50 denotes at its inputs two logic 1's and thus the output of NAND gate 50 goes from the long term logic 1 to a logic 0. This can be seen in FIG. 3E of the designation of Signal E. When Signal E goes, for the first time to a logic 0, flip-flop 60 can be set or reset accordingly in order to energize subsequent circuitry to remove volatile data to a non-volatile storage medium and thus protecting the competency of the program and data being run on the unit.

Thus, after a failure point the circuitry instantaneously, within the one or two milli-seconds in which the data can be shifted to a non-volatile storage medium, the circuitry instantaneously detects the reversal of current and the instantaneous drop to zero of the voltage in the system. The one-shot which has been triggered every time in proportion to the phase shift between the input voltage and current signals, now is detecting the change in threshold voltage at the one-shot and thus the logic level at the output of NAND gate 50 becomes a logic 0 for the first instance and triggers subsequent circuitry for protection of the volatile data. Once the instantaneous output denoting a failure is generated and the data is transferred to registers and other permanent memories, the circuitry will still operate for some time but by then the data has been protected and no further monitoring of the circuit is necessary. Thus, within approximately 1 milli-second of power failure, the internally stored power in the system has energized protection circuitry which moves the data to a permanently designed storage for subsequent use at the time system power is reapplied.

Thus, while the invention has been described with reference to a specific embodiment, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What is claimed is:

1. A power fault detection system comprising:
   first means for detecting applied voltage and generating a voltage sensed signal, second means for detecting applied current and generating a current sensed signal, multiplier means for multiplying the voltage and current sensed signals, circuit means coupled to said multiplier means for generating predetermined width signals in response to the output from said multiplier means, and logic circuit means coupled to the output of the circuit means and the output of the multiplier means for detecting the logic level of said outputs, said logic circuit means remaining in a first logic state at an indication of power flowing in a first direction in said system and switching to a second logic state at an indication of power flowing in a second direction in said system.

2. The system as set forth in claim 1 wherein said first and second means comprise:
   first and second operational amplifier means for generating rectangular shaped voltage signals in direct relationship to the applied voltage and current respectively.

3. The system as set forth in claim 2 wherein said multiplier means generates a signal in direct relationship to power represented by the applied voltage and current.

4. The system as set forth in claim 3 wherein said circuit means comprises:
   one-shot circuit means for generating predetermined width signal pulses in response to the zero crossings of the signals from said multiplier means.

5. The system as set forth in claim 4 wherein said logic circuit means comprises:
   NAND gate means for monitoring the logic levels of the signals from said one-shot means and said multiplier means.

6. The system as set forth in claim 5 wherein said first and second means further comprise:
   first and second reverse biased diode means coupled to the output and one input of said first operational amplifier means to limit the amplitude of said generated rectangular shaped voltage signal, and
third and fourth reverse biased diode means coupled to the output and one input of said second operational amplifier means to limit the amplitude of said generated rectangular shaped voltage signal.

7. The system as set forth in claim 6 further including:
fifth reverse bias diode means coupled to the output of said multiplier means to limit the amplitude of the signal from said multiplier means.

8. The system as set forth in claim 1 further comprising:
second circuit means coupled to said logic circuit means and responsive to a change in logic states so as to indicate that said power is flowing in said second direction.

9. A power fault detection system comprising:
first operational circuit means for generating a first predetermined amplitude signal in response to a detected voltage,
second operational circuit means for generating a second predetermined amplitude signal in response to a detected current flow,
means for multiplying the outputs from said first and second operational circuit means to generate a signal of two logic states in proportion to the detected zero crossings of the detected voltage and current signals,
circuit means for generating predetermined width signals in response to the output signals from said multiplying means,
first logic circuit means coupled to the output of said circuit means and said multiplier means for denoting the logic level of the respective input signals, and
second logic circuit means coupled to said first logic means to detect a change in output logic level of said first logic circuit means at a time that said first operational circuit means detects an immediate drop to a substantially zero voltage level and the second operational circuit means detects an immediate reversal of current flow.

10. In a computer system wherein operations are being performed on data in volatile registers and memories, a power fault detection system for monitoring the change of power flowing in the system from that externally applied to that inherently stored in the system so as to initiate transferring said data to a non-volatile register or memory comprising:
means for monitoring the power flow through the system,
means coupled to said monitoring means for detecting the change of direction of current flow within said system from that externally applied to said system to that inherently stored in said system, and
means coupled to said detecting means for switching from a first state to a second state at the time said power flow changes direction within said system.

11. The system as set forth in claim 10 wherein said monitoring means comprises:
first and second operational amplifier means for generating voltage signals in direct relation to the voltage and current respectively, which comprise said power flow.

12. The system as set forth in claim 11 wherein said detecting means comprises:
multiplier circuit means for multiplying said voltage signals from said first and second operational circuit means, the polarity of the output of said multiplier circuit means denoting the direction which said power is flowing in said system.

13. The system as set forth in claim 12 wherein said switching means comprises:
one-shot circuit means for generating predetermined width signal pulses in response to the zero-crossings of the signals from said multiplier circuit means, and
NAND gate means coupled to said one-shot circuit means and said multiplier circuit means for switching from a first logic level to a second logic level when the signals from said one-shot circuit means and said multiplier circuit means are both of the same polarity.

14. The system as set forth in claim 13 further including:
flip-flop circuit means coupled to said NAND gate means for generating a predetermined logic level signal at the time said NAND gate means changes from said first logic level to said second logic level.

15. A method for detecting the interruption of input power to a system comprising:
detecting the voltage and current values representative of the power flow through said system,
monitoring the direction of power flow of said system by detecting the change of direction of current flow within said system from that externally applied to said system to that inherently stored in said system, and
generating an output enabling signal in response to the detected change of direction of power flow in said system.

16. A method of monitoring the change of direction of power flow in a system from that externally applied to that inherently stored in said system comprising:
generating first and second voltage signals in response to the values of the voltage and current representative of the power flowing in said system,
multiplying said first and second voltage signals to generate a signal representative of the direction of power flowing in said system, and
further generating an output signal of a first polarity indicative of external power flowing into said system and of a second polarity indicative of inherently stored power flowing out of said system.

17. The method as set forth in claim 15 wherein said step of monitoring further includes detecting an immediate drop to a substantially zero voltage level due to the interruption of said external power.

18. The system as set forth in claim 10 further including means for detecting an immediate drop to a substantially zero voltage level due to a power fault.

* * * * *